Sept. 5, 1933.  R. J. GITS  1,925,729
OIL SEAL
Filed Nov. 8, 1929
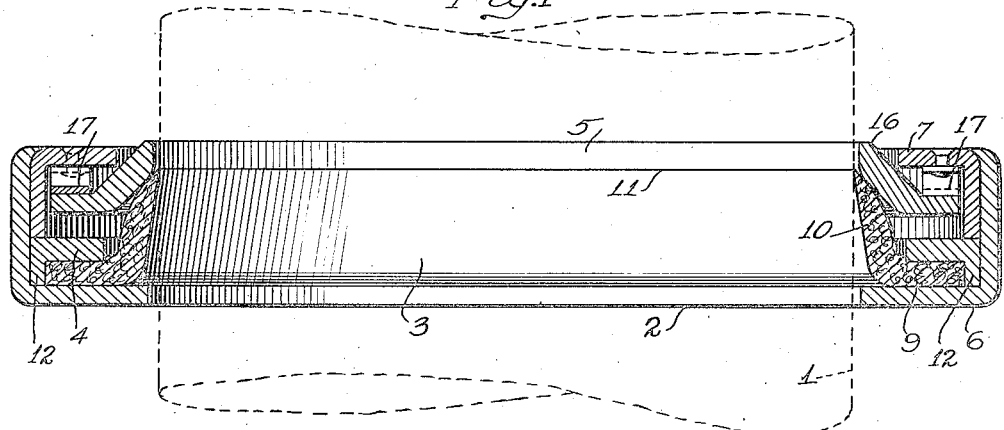
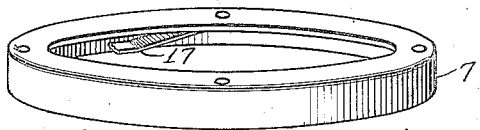
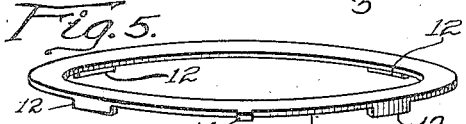
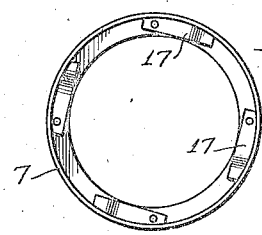
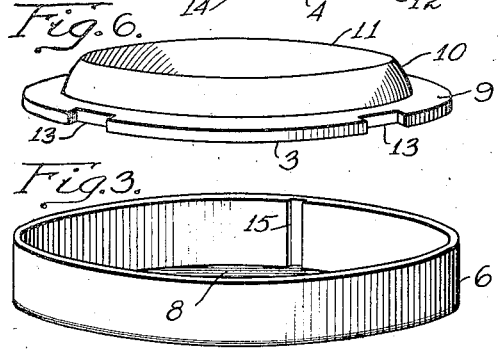
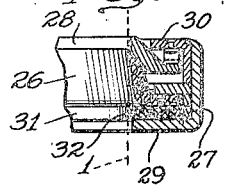
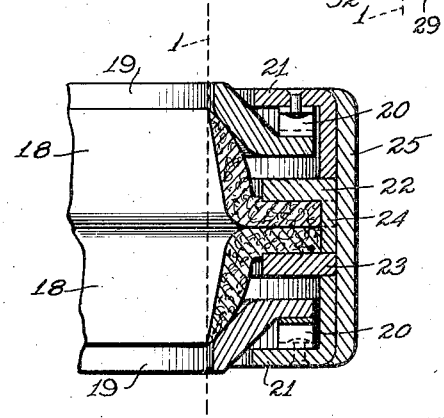
Witnesses
Arthur M. Framke.
Wm. E. Anderson.
Inventor.
Remi J. Gits,
By Kummler & Kummler,
Attys.

Patented Sept. 5, 1933

1,925,729

UNITED STATES PATENT OFFICE 1,925,729

OIL SEAL

Remi J. Gits, Chicago, Ill.

Application November 8, 1929. Serial No. 405,781

8 Claims. (Cl. 288—1)

This invention relates to oil seals which are applied to shafts for preventing the leakage of oil from the housings through which the shafts project.

The main objects of this invention are to provide an oil seal having an improved form of flexible washer; to provide an improved form of casing for housing the washer; to provide improved means for clamping the washer to said casing so as to prevent the passage of oil through said casing around the outer rim of said washer; to provide improved means for contracting the inner rim of said washer to maintain it in effective and uniformly distributed contact with the shaft; and to provide improved pressure means for urging said contracting means into effective engagement with said washer.

Illustrative embodiments of this invention are shown in the accompanying drawing, wherein:—

Figure 1 is a central section of an improved oil seal applied to a shaft which is shown in dotted outline.

Figs. 2 and 3 are perspective views of the two separate parts of the drum or casing.

Figs. 4, 5, and 6 are perspective views of the contracting ring, clamping ring and washer, respectively.

Fig. 7 is a bottom plan, on a reduced scale, of the casing part shown in Fig. 2.

Figs. 8 and 9 are sectional details illustrating modified forms of seals adapted to prevent the passage of oil in both directions along the shaft.

Seals embodying this invention may be either the single type or the double type. The single type is employed where it is necessary to prevent the liquid from flowing along the shaft in only one direction and the double type is employed where it is necessary to prevent liquid from flowing in both directions.

In the forms shown, the improved seal comprises a casing or drum to which is clamped a flexible washer having a rim adapted to be contracted for effective contact with a shaft by means of an improved washer contracting ring. A shaft 1 is illustrated in dotted outline.

The single type of seal illustrated in Figs. 1 to 7, inclusive, comprises a drum 2 in which is located a washer 3 clamped to the drum by a clamping ring 4 and arranged to be contracted by a contracting ring 5.

The drum 2 preferably comprises a pair of metal annular interfitting parts 6 and 7, which surround the shaft. These two parts may be secured together by rolling the rim of the part 6 over the part 7, as illustrated, or in any other suitable manner. Formed on the part 6 is an annular substantially flat bearing surface 8 to which the washer 3 is clamped.

In the form shown in Figs. 1 and 6, the improved washer 3 has an annular flange 9 bearing against the surface 8 and an inner rim 10 arranged to embrace the shaft 1. The rim 10 is substantially conoidal and also tapers to a sharp shaft engaging edge 11.

The clamping ring 4 bears against the washer flange 9 and compresses the latter, as shown in Fig. 1, so as to prevent the passage of oil through the drum around the outer rim of the flange 9. Formed on the clamping ring 4, is a plurality of shoulders 12 extending through recesses 13 in the flange 9 for engagement with the bearing face 8 of the drum, so as to avoid any tilting of the clamping ring which might render it ineffective.

In order to secure the clamping ring 4 against rotation relative to the drum, it is provided with a radially disposed lug 14 engaging a recess 15 in the casing part 6. The clamping ring is secured in its effective position by the inner wall of the drum part 7, as illustrated in Fig. 1.

In order to maintain the washer in close contact with the shaft, its inner rim is contracted by the improved ring 5, which is provided with a frusto-conical bearing part 16 adapted to bear against the rim 10 of the washer. The contracting ring 5 is movable axially and is urged into effective engagement with the washer by a plurality of springs 17 secured to the drum part 7. The springs 17 are under tension so that the ring 5 will continue to contract the washer rim 10 as the latter is worn away by the shaft.

The double type of seal shown in Fig. 8 comprises a pair of oppositely disposed abutting washers 18, adapted to be contracted by contracting rings 19, which are urged inwardly by springs 20 secured to inverted cup shaped drum parts or rings 21.

These elements 18, 19, 20 and 21 are similar in construction to the corresponding parts illustrated in Figs. 2, 4 and 6.

The washer clamps shown in Fig. 8 comprise a pair of metal rings 22 and 23, which are held in clamping position by annular internal shoulders formed by the rim margins of the inverted cup shaped drum parts or rings 21. Formed on the ring 22, are shoulders 24 extending through the washers for contact with the ring 23. The outer drum part of the construction shown in Fig. 8 comprises a ring member or shell 25 which embraces the parts 21, 22 and 23 the end edges of the drum shell 25 being rolled over to provide marginal portions engaging the parts 21 to clamp them against the rings 22 and 23 and to secure them against axial displacement.

The double seal illustrated in Fig. 9 includes a washer 26, clamping ring 27, contracting ring 28, and drum parts 29 and 30 which are similar in construction to the corresponding parts shown in Fig. 1. In this double seal, there is a second washer 31, which is clamped between the washer 26 and the drum part 29. The washer 31 is substantially flat and has an inner rim 32 for contact with the shaft.

In operation, the improved contracting ring maintains the washer rim in effective and uniformly distributed contact with the shaft and, as the shaft engaging edge of the washer is worn away, the springs on the drum urge the contracting ring axially for further contracting the washer rim.

Although but certain specific embodiments of this invention have been herein shown and described, it will be understood that numerous details of the construction shown may be altered or omitted without departing from the spirit of this invention as defined by the following claims.

I claim:

1. A seal comprising a casing adapted to surround a shaft, a flexible washer mounted in said casing, having a radially extending flange engaging said casing and an annular axially extending portion adapted to embrace the shaft, said axially extending portion being tapered inwardly toward the shaft and having inner and outer walls of frusto-conical form converging to present a sharp annular edge to the shaft, and a contracting member surrounding said axially extending portion and having a conoidal bearing surface of greater pitch relative to the surface of the shaft than the outer wall of said axially extending portion such that the inner portion only of said conoidal bearing surface engages said axially extending portion, said contracting member being normally urged axially toward the radial flange of said washer for contracting said annular edge.

2. A seal comprising a casing adapted to surround a shaft and having a substantially flat bearing surface, a flexible washer engaging said bearing surface and adapted to embrace the shaft, a ring for clamping said washer to said surface, and shoulders on said ring extending through recesses in said washer for engagement with said bearing surfaces.

3. An oil seal comprising a drum adapted to surround a shaft and having a pair of telescoping parts, a flexible washer within said drum having an inner rim adapted to embrace the shaft, a clamping ring for clamping said washer to the outer one of said telescoping parts, the inner one of said telescoping parts engaging said clamping ring for securing said ring in effective contact with said washer, a washer contracting member spaced from said clamping ring and adapted to contract said rim, and means on said inner telescoping part for urging said contracting member toward said washer.

4. An oil seal comprising a drum adapted to surround a shaft and having a pair of telescoping parts, a flexible washer within said drum having an inner rim adapted to embrace the shaft, a clamping ring for clamping said washer to the outer one of said telescoping parts, the inner one of said telescoping parts engaging the clamping ring for securing said ring in effective contact with said washer, a washer contracting member spaced from said clamping ring adapted to contract said rim, and means between said inner telescoping part and said washer contracting member for urging said contracting member toward said flexible washer.

5. A seal comprising a casing adapted to surround a shaft and having a substantially flat bearing surface, a flat flexible washer engaging said bearing surface and adapted to embrace the shaft, a second flexible washer having a radial portion engaging said flat flexible washer and an axially extending portion adapted to embrace the shaft, a ring for clamping both of said washers to said bearing surface, and a shoulder on said ring extending through registered recesses in said washers for engagement with said bearing surface.

6. A seal comprising a casing adapted to surround a shaft and having an annular internal shoulder spaced inwardly from one end, a flat clamping ring disposed within said casing against said annular shoulder, a pair of oppositely disposed flexible washers arranged within said casing and having oppositely extending axial portions adapted to embrace the shaft, a second clamping ring adapted to clamp radially extending portions of said washers against the first named clamping ring, and a shoulder on said second ring extending through registered recesses in said washers to engage the first named clamping ring.

7. An oil seal comprising a pair of oppositely disposed flexible washers adapted to embrace a shaft, each washer having a radially extending portion and an axially extending portion, a pair of clamping rings engaging the radially extending portions of said washers and clamping said portions therebetween, a shoulder on one of said clamping rings extending through registered recesses in said washers to engage the other of said clamping rings, a pair of inverted cup shaped rings each having a rim abutting one of said clamping rings, a pair of contracting rings each positioned and adapted to embrace the axially extending portion of a respective washer, each of said contracting rings being disposed between a respective cup shaped ring and clamping ring and each being spaced axially from the respective clamping ring, means between each contracting ring and cup shaped ring normally urging the contracting ring toward a respective clamping ring, and a drum shell peripherally surrounding the oil seal assembly and having marginal portions engaging said cup shaped rings to secure the same against axial displacement.

8. A seal comprising a casing adapted to surround a shaft, a flexible washer mounted in said casing and having an annular axially extending portion adapted to embrace the shaft, said axially extending portion being of frusto-conical form tapering inwardly toward said shaft, the surface of the outer wall of said axially extending portion being curved in an axial direction away from said shaft, and a contracting member bearing on a narrow portion only of said curved outer surface for urging the rim of said axially extending portion toward the shaft.

REMI J. GITS.